June 11, 1963 — I. D. JACOBSON — 3,093,161
LINED NIPPLE ASSEMBLY FOR HOT WATER TANKS
Filed Feb. 13, 1962
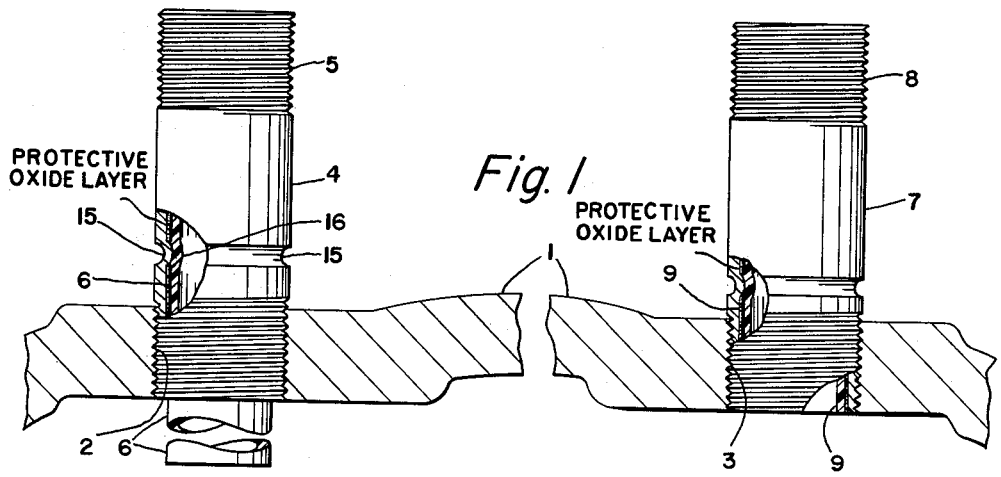
Fig. 1
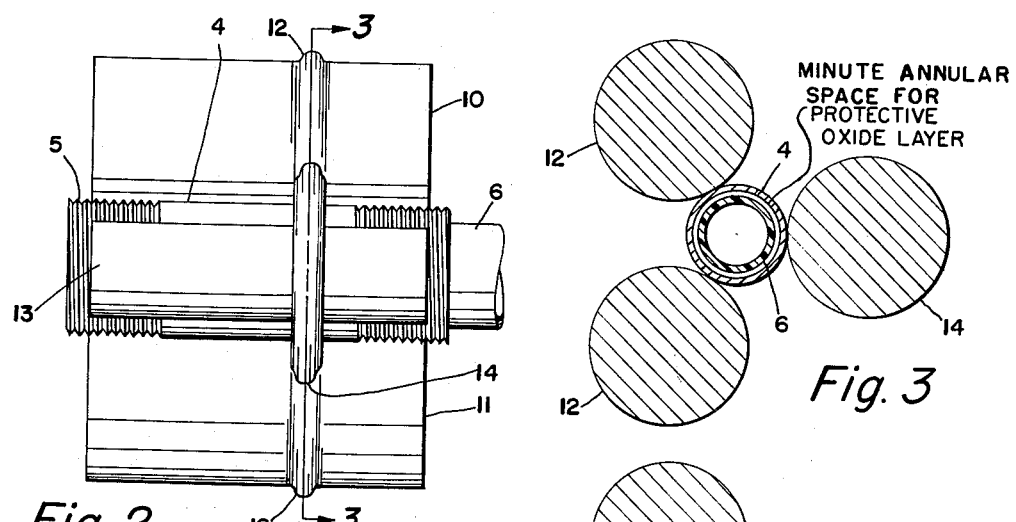
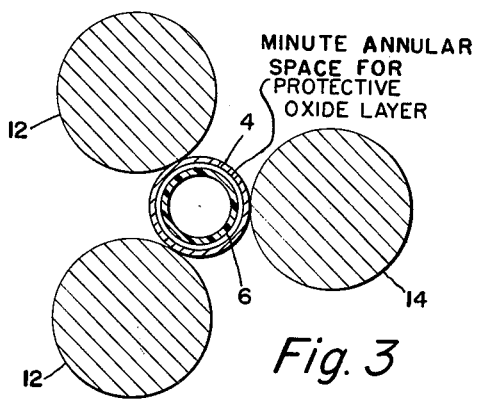
Fig. 3
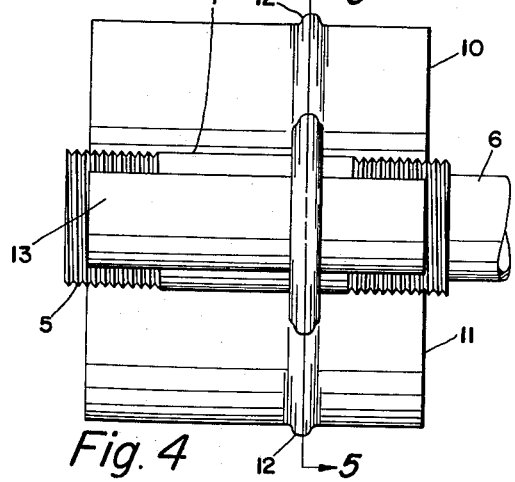
Fig. 2
Fig. 4
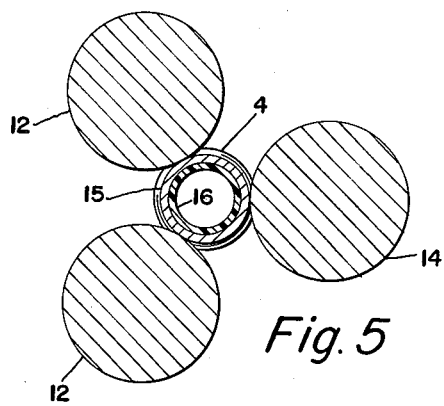
Fig. 5
INVENTOR.
IRVIN D. JACOBSON
BY
ATTORNEYS

United States Patent Office 3,093,161
Patented June 11, 1963

3,093,161
LINED NIPPLE ASSEMBLY FOR HOT WATER TANKS
Irvin D. Jacobson, Painesville, Ohio, assignor to Perfection Pipe Nipple Company, Madison, Ohio, a corporation of Ohio
Filed Feb. 13, 1962, Ser. No. 172,942
2 Claims. (Cl. 138—143)

This invention relates, as indicated, to a lined nipple assembly for hot water tanks and the like.

It has heretofore been proposed, as in Boylan Patent 2,842,163 and McCauley Patent 2,921,606, to introduce cold water into a hot water tank, through a relatively thin walled dip tube, which is supported at its upper end upon the upper end of a metallic nipple which is welded or otherwise secured to the top or head of the tank.

Due to the relatively large space between the nipple and the plastic tube, and the rather loose and uncontrollable support of the plastic tube on the nipple, water from the tank or from the water supply system to the tank, can readily pass through this space and cause dislodgement or displacement of the plastic tube from the nipple as well as corrosion and erosion of the nipple, which, in most cases, is made of steel, with the result that frequent replacement of the nipple is required.

It has also been proposed, as in the Smith et al. Patent 1,911,775, to connect telescoped metallic pipes together by means of interlocked corrugations formed in the ends of the telescoped pipes. Where, as in the aforementioned Patents 2,842,163 and 2,921,606, the space between the plastic tube and nipple is relatively wide, any attempt to interlock the plastic tube and nipple in the manner suggested by the Smith patent would require so much distortion of the wall of the nipple as to cause it to become ruptured or stretched beyond a safe point.

The present invention has as its primary object the provision of a novel metallic nipple and plastic tube or liner assembly, the use of which, in connection with hot water tanks, virtually eliminates any possibility of water circulating or passing through the space between the nipple and plastic tube, and avoids any possibility of the plastic liner from becoming dislodged or displaced from the nipple.

Another object of the invention is to provide a novel metallic nipple and plastic tube or linear assembly, in the use of which the nipple can be corroded to only a minimum or limited extent, so that the nipple need not be replaced throughout the life of the tank. This enables the cost of replacements and repairs to be reduced to a minimum, and enables the life of the tank to be greatly increased.

A further object of the invention is to provide a novel assembly or unit of the character described, in which the nipple and plastic tube are interlocked with each other in a manner which assures a concentric relationship of the two, which avoids any tendency of the parts to become misaligned or "whip" relatively to each other, and which provides a leak-proof or water-proof seal between the parts.

Other objects and advantages of my invention will be apparent during the course of the following description.

In the accompanying drawings forming a part of the specification, and in which like numerals are employed to designate like parts throughout the same, FIG. 1 is a fragmentary cross-sectional view of the top of a hot water tank, showing the invention;

FIG. 2 is a view, showing the first step in the method of interlocking the nipple and tube;

FIG. 3 is a cross-sectional view, taken on the line 3—3 of FIG. 2;

FIG. 4 is a view, similar to FIG. 2, but showing the second or final step in the method of interlocking the nipple and tube, and FIG. 5 is a cross-sectional view, taken on the line 5—5 of FIG. 4.

Referring more particularly to FIG. 1 of the drawings, reference numeral 1 designates the top of head of a conventional hot water tank which is provided with threaded openings 2 and 3.

Threadedly secured within the opening 2 is a steel nipple 4, the upper end of which is exteriorly threaded, as at 5, for the connection thereto of a cold water supply pipe (not shown).

Secured within the nipple 4 is a dip tube 6, preferably made of a plastic of the thermoplastic type, as, for example, Kralastic, polypropylene or polyethylene, which tube extends downwardly into the hot water tank to a point adjacent the bottom of the tank.

Threadedly secured within the opening 3 is a steel nipple 7, similar to the nipple 4, and the upper end of which is exteriorly threaded, as at 8, for the connection thereto of a hot water outlet pipe (not shown).

Secured within the nipple 7 is a tubular insulating liner 9, which is also preferably made of the plastic similar to that from which the dip tube 6 is made. It may be noted, in this connection, that the portion of the tube 6, within the nipple 4 also constitutes an insulating liner for the nipple 4.

The tubes 6 and 9 have an external diameter which is substantially the same as the internal diameter of the nipples 4 and 7 respectively, so that, in the absence of any interlocking of the tubes to the nipples, the tubes would have what may be termed a slip fit in the nipples.

The dip tube 6 and liner 9 are locked to their respective nipples in a manner to be now described.

In locking the dip tube 6 to the nipple 4, the nipple 4 is disposed against a pair of spaced idler roll dies 10 and 11, as shown in FIGS. 2 and 3, each of these roll dies being provided with an annular rib 12 of substantially semi-circular cross-section. One end of the dip tube 6 is then inserted through the nipple, after which a third power-driven roll die 13, similar to the dies 10 and 11, and provided with an annular rib 14 of substantially semi-circular cross-section, is disposed adjacent the nipple, in circumferentially-spaced relation to the dies 10 and 11.

The die 13 is then pressed against the nipple 4 and simultaneously rotated, the idler dies 10 and 11 also rotating at the same time, and the conjoint action of the ribs 12 and 14 distorts or displaces the metal of the nipple, so that an inwardly extending annular rib or corrugation 15 is formed in the wall of the nipple, between the threaded ends of the latter. In the course of formation of this rib or corrugation, the wall of the dip tube 6 is similarly displaced inwardly, forming an annular rib or corrugation 16 in the tube. This operation is shown in FIGS. 4 and 5.

Due to the resilient characteristics of the plastic of which the dip tube is made, the rib or corrugation 16 has a tendency to restore itself to its original condition, i.e., the original diameter of the tube 6, and this tendency causes the rib or corrugation 16 to be firmly interlocked to the rib or corrugation 14 of the nipple 4. Moreover, when the metal of the nipple is thus distorted, the inner surface of the rib 15 is broken slightly, so as to form a large number of gripping points, which increase the frictional contact between the ribs 15 and 16. All of this produces an interlocking between the ribs which is so strong as to form virtually a leak-proof or water-proof seal between the ribs 15 and 16, which prevents water from passing through this seal.

The nipple 7 is locked to the insulating liner 9 by the same means and in the same manner that the nipple 4 is locked to the tube 6, so that further description of such locking is unnecessary, the interlocked ribs being clearly shown in FIG. 1 of the drawings.

Due to the interlocking of the nipple 4 with the tube 6 in the manner described, and the fact that the tube 6 fits closely inside the nipple, with little or no space therebetween, a number of advantages are obtained. In the first place, a concentric alignment of the nipple and tube is assured. In the second place, any tendency of the tube 6 to become misaligned with respect to the nipple, or to "whip" within the nipple and tank, is obviated. In the third place, a seal is provided, which makes the combined nipple and tube leak-proof and precludes free circulation of water between the nipple and tube.

Although the space between the nipple and tube is maintained as small as possible, a clearance of possibly several thousandths of an inch is necessary between the nipple and the tube to permit assembly of the tube with the nipple. Any water initially seeping into this narrow annular or clearance space, either from the tank or from the supply pipe is prevented by the seal formed by the interlocked corrugations 15 and 16 from passing or circulating beyond this seal, so that there can be no extensive corrosion or erosion of the nipple by such circulating water which would normally carry a large amount of oxygen. Instead, such water is entrapped in the clearance spaces and does not carry sufficient oxygen into these spaces to create a corrosive reaction which would culminate in rust products which would eventually cause complete corrosion of the nipple. Such reaction as takes place forms ferrous oxide (FeO) plus neutral water which is trapped in these annular clearance spaces.

Ferrous oxide is one of the best protective coatings for steel if it can be held on the surface. The tight seal created by the interlocked ribs 15 and 16 stops the free circulation of water that would otherwise erode this protective coating, and thereby holds the coating in place. The result is that the negligible amount of oxygen that can diffuse into the neutral water cannot penetrate the ferrous oxide and corrosion is practically stopped. The effectiveness of this condition depends on the tightness of the rib 15 with the contiguous surface of the dip tube 6 or liner 9.

Due to the fact that the nipples of this invention are made entirely of steel, and are directly connected to the tank, which is also made of steel or cast iron, the tendency to electrolytic corrosion, present where nipples of a dissimilar metal are used, is greatly minimized, and this is particularly true, in the case of the nipple 7, through which the hot water passes.

Although it is preferable, as stated, that the tubes 6 and 9 have an external diameter which is substantially the same as the internal diameter of the nipples 4 and 7 respectively, the actual spacing between the two may, in fact, vary up to several thousandths of an inch.

Moreover, although the connection between the nipples and tubes has been described as comprising a single corrugation or rib formed on the nipple and tube, it may, in some instances, be desirable to form two such corrugations or ribs on each nipple and tube, such corrugations or ribs being in axially-spaced relation to each other, so that the nipples and tubes will be interlocked with each other at axially-spaced points. Such a variation will be well understood, and need not be illustrated.

It is thus seen that I have provided a novel metallic nipple and plastic tube assembly or unit, the use of which, in connection with hot water tanks, virtually eliminates any possibility of water circulating or passing through the space between the nipple and plastic tube, and which avoids any possibility of the plastic tube from becoming dislodged or displaced from the nipple.

It is further seen that I have provided an assembly of this character, in the use of which, corrosion of the nipple is reduced to a minimum, and erosion of the nipple is precluded, with the result that the unit does not have to be replaced during the life of the tank.

It is also seen that I have provided an assembly or unit of this character in which the nipple and tube are so interlocked as to assure a concentric relation of the two at all times, and a leak-proof seal is provided between the nipple and tube.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

This application is a continuation-in-part of my co-pending application, Serial No. 800,296, filed March 18, 1959, now abandoned.

Having thus described my invention, I claim:

1. A lined nipple assembly for a hot water tank having a top provided with an opening, said assembly comprising a metallic nipple secured to said top in alignment with said opening, a tubular member of plastic material extending through said nipple, said member having an external diameter substantially the same as the internal diameter of the nipple, means interlocking said nipple and said member with each other, said means comprising at least one corrugation on said nipple, said corrugation being tightly engaged with the contiguous area of the surface of said member to provide a substantially leak-proof seal between said corrugation and said contiguous area of said member and to maintain a minute annular space between remaining areas of said nipple and said member and serving to entrap water initially seeping into said minute annular space between said nipple and member, and a protective oxide layer within said minute annular space, said oxide layer being formed by an initial oxidation of said metallic nipple in the presence of said initial seepage of water, said interlocking means and said minute annular space entrapping said oxide layer and precluding the free circulation of water within said space and the resultant erosion of said protective oxide layer whereby further oxidation is prevented.

2. The combination of claim 1, wherein said plastic tubular member extends downwardly past said nipple into the tank.

References Cited in the file of this patent

UNITED STATES PATENTS

| | | |
|---|---|---|
| 1,153,724 | Stocker | Sept. 14, 1915 |
| 1,322,250 | Lewis | Nov. 18, 1919 |
| 2,051,590 | Bratz | Aug. 18, 1936 |
| 2,560,565 | Freeman | July 17, 1951 |
| 2,652,358 | McFerran | Sept. 15, 1953 |
| 2,764,427 | Andrus | Sept. 25, 1956 |
| 2,971,532 | McLaren et al. | Feb. 14, 1961 |